United States Patent [19]

Reiner

[11] 3,767,050
[45] Oct. 23, 1973

[54] FILTRATION SYSTEM FOR LIQUIDS
[75] Inventor: Norbert L. Reiner, Wallingford, Conn.
[73] Assignee: Coleco Industries, Inc., Hartford, Conn.
[22] Filed: Jan. 4, 1972
[21] Appl. No.: 215,304

[52] U.S. Cl.............. 210/169, 210/259, 210/266, 210/278
[51] Int. Cl...................... B01d 29/08, B01d 29/42
[58] Field of Search.................... 210/169, 259, 263, 210/275, 277, 278, 279, 289, 317, 335, 436, 210/437, 472

[56] References Cited
UNITED STATES PATENTS

| | | | |
|---|---|---|---|
| 3,685,657 | 8/1972 | Hunter et al. | 210/289 |
| 3,420,376 | 1/1969 | Smith | 210/275 X |
| 3,653,513 | 4/1972 | Ortega et al. | 210/472 X |
| 3,173,865 | 3/1965 | Bosico | 210/259 X |
| 3,054,507 | 9/1962 | Humbert et al. | 210/493 |

Primary Examiner—Samih N. Zaharna
Assistant Examiner—I. Cintins
Attorney—Peter L. Costas

[57] ABSTRACT

A filtration system for liquids employs a sealed tank that is partially filled with sand or the like to provide a filtration bed in the lower portion thereof. An underdrain device is buried in the bed of sand and prevents particles from passing outwardly from the bed with the liquid flowing through the system. One end of a vent conduit is attached to the underdrain device from which it passses upwardly through the sand to a point near the top of the tank. Air introduced into the tank escapes automatically through the vent conduit, thus eliminating the need for the valves which are conventionally provided in the upper portion of such tank filters for the same purpose. The filtration system includes a particulate or sand filter unit coupled with a fabric type filter to remove very fine particles from the liquid removed from the liquid treated in the sand filter unit. The system is particularly adapted for use with swimming pools, and is capable of removing very fine particles from water flowing at high rates through the system.

10 Claims, 8 Drawing Figures

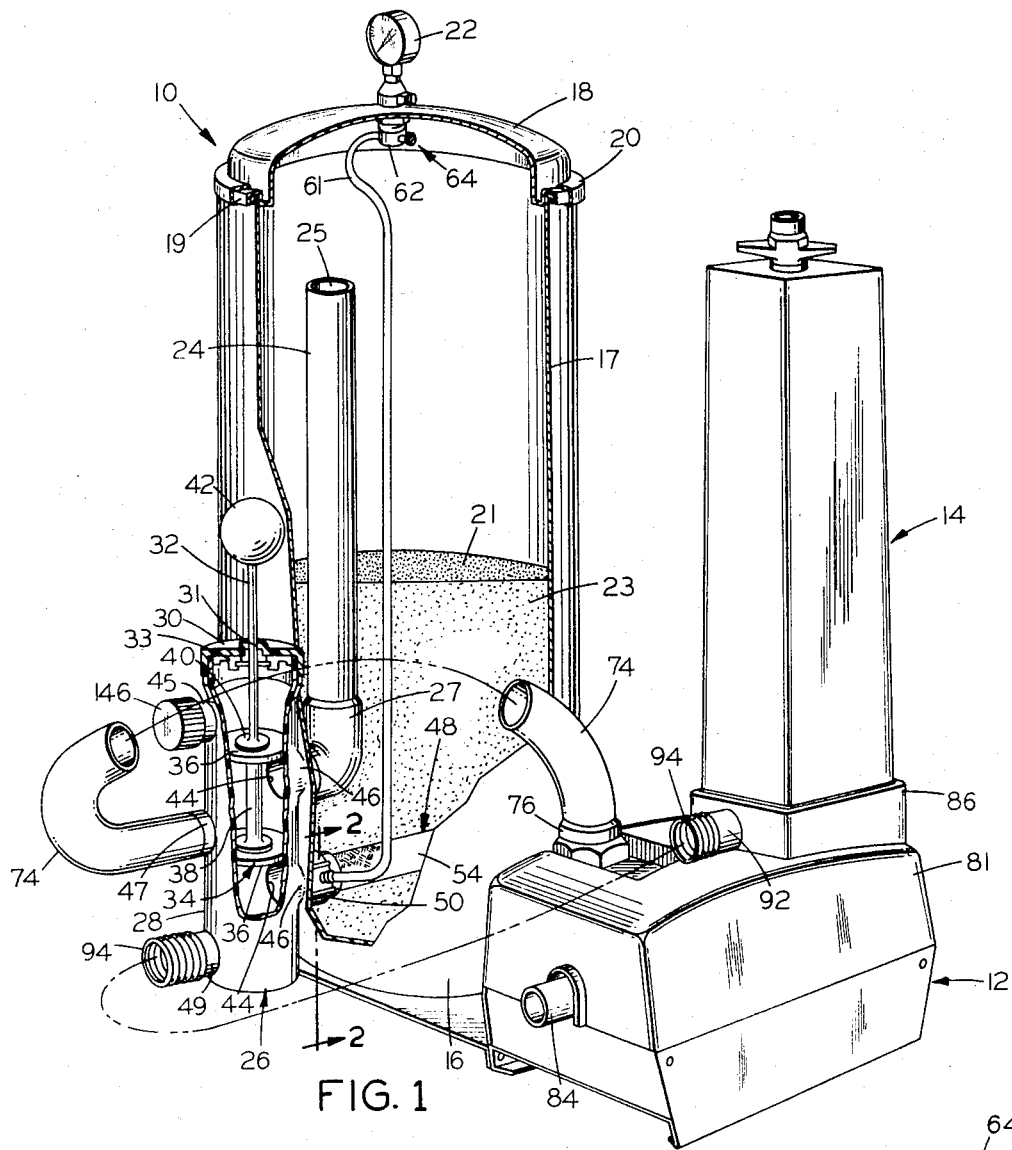
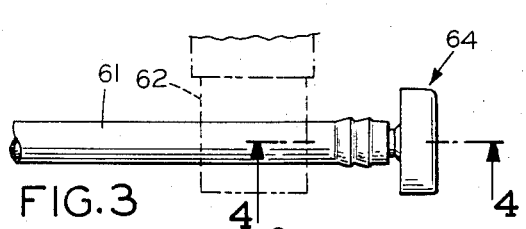
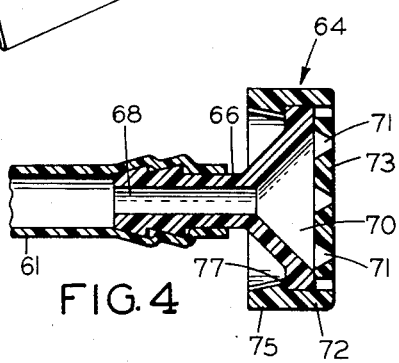
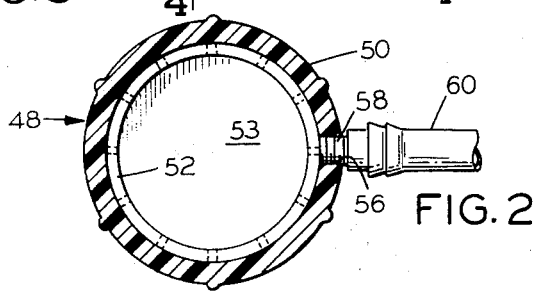

FILTRATION SYSTEM FOR LIQUIDS

BACKGROUND OF THE INVENTION

Swimming pools and the like employ filtering devices through which the water may be circulated on a continuous or intermittent basis. In many cases sealed tanks which are partially filled with sand or other particulate filtering media are used, water being pumped from the swimming pool into the tank, where it is discharged upon the upper surface of the sand to be filtered as it passes downwardly through the bed.

It is not uncommon for considerable quantities of air to be carried into such a tank with the water, and this can result from any of several different causes. For example, surface skimmer devices (such as are disclosed and claimed in Diemond et al. U. S. Pat. Nos. 3,508,661 and 3,616,918) are widely employed at the side of the pool for water drainage and also to serve a preliminary filtration function. During operation of the circulation pump, splashing and normal water movement within the pool will cause a certain amount of air to be sucked into the system through the skimmer, ultimately to be conveyed and trapped within the tank.

As long as the volume of air is not excessive, its presence in the tank will generally have little effect while the pump is operating. However, when pumping action ceases the pressurized air which has collected at the top of the tank will often "blow back" through the system; this not only frustrates the filtering procedure by returning collected dirt and debris to the pool, but in blowing through the pump the water seal may also be lost, necessitating repriming of the pump for subsequent operation.

To avoid this problem, prior systems of this sort have provided a valve through a wall in the upper portion of the tank, with the intent that it be opened periodically to permit accumulated air to escape. However, this solution has not been completely satisfactory due to the inconvenience involved and due to the common failure to tend the system to the extent necessary.

One of the characteristics of filters which rely upon sand or a similar material as the filtration medium is that they are of limited capability with respect to the size of particles which may be removed from the liquids passing therethrough. On the other hand, they are very satisfactory from the standpoint of providing high flow rates with relatively low pressure requirements, and they may conveniently be cleaned by relatively simple backflush operations. Cartridge filters utilizing fabric filter elements have also been employed quite extensively in water filtration systems. Although they are effective in attaining high levels of clarity and water purity because pore sizes may be quite small, rates of flow through them tend to be low and pressure requirements are often high unless the surface area of the fabric is large. Since the cartridge of such a unit may be readily removed and replaced usage is convenient; however, due to the large amounts of matter which they collect, such filters are limited as a practical matter to use in relatively small systems where the need for replacement will not occur with undue frequency. Hence, there is a need for a balanced system that is capable of filtering water to high levels of cleanliness under practical operating conditions.

Accordingly, it is an object of the present invention to provide a novel filtration system for liquids having means to automatically prevent the accumulation of gases within a substantially sealed tank.

It is also an object of the invention to provide such a system wherein vent means is conveniently and inexpensively provided.

Another object of the invention is to provide a novel and pratical filtration system for liquids which is capable of removing very small particles from the liquid at high flow rates.

Still another object is to provide such a system wherein the filtration units are of a practical size and wherein pump pressures required for operation are relatively low.

A further object is to provide a filtration system of the foregoing type which can be prepared for reuse after a period of operation with relative facility, and which requires such preparation on a relatively infrequent basis.

A still further object is to provide such a system in which a large particle filtration unit may be readily cleaned by backflushing without necessitating passage of the flush water through a fine filtration unit thereof.

SUMMARY OF THE DISCLOSURE

It has now been found that the foregoing and related objects of the invention are readily attained in a filtration system including a tank filter unit comprising a substantially sealed tank providing a chamber, which is partially filled with a particulate medium to provide a filtration bed in the lower portion thereof. The tank has inlet and outlet passages from the chamber to the exterior thereof, with the inlet passage opening into the chamber at a location above the normal upper surface of the filtration bed. The system also includes a filter underdrain device having a porous filtration portion that is normally buried in the filtration bed and is adapted to permit liquid flow while preventing the entry of particles of the bed thereinto. A substantially nonporous connecting portion of the underdrain device provides a conduit extending from the filtration portion which is connected to the outlet passage of the tank to provide communication therewith from the interior of the filtration portion. A vent conduit extends from a point adjacent the upper surface of the chamber, downwardly through the filtration bed and into connection with the underdrain device. It is open at its upper end to the upper portion of the chamber and at its other end into the underdrain device. The vent thereby provides an outlet for gas from the tank into fluid being discharged through the outlet passage, and as a result eliminates pressure buildup in the upper portion of the chamber.

Preferably the end of the vent conduit joined to the underdrain device extends perpendicularly to the axis thereof and opens within its nonporous connecting portion, with the device being generally elongated and having the connecting portion at one end. In such a case, water flowing through the underdrain device will have a substantial axial flow velocity vector at the point of passage past the end of the vent conduit, thereby tending to reduce pressure within the vent conduit and facilitating the escape of gas from the vicinity of the top of the tank.

The filtration system includes a cartridge filter unit, in addition to the tank filter unit and filter underdrain device hereinbefore described, the latter comprising a substantially sealed housing having an internal chamber with a replaceable cartridge member therewithin and with inlet and outlet passages therefrom. The cartridge member comprises an elongated perforated core and a pleated filtration element of porous fabric having pores about 2 to 12 microns in diameter. The filtration element extends about and axially along the core over the perforations thereof with the pleats of the fabric extending radially outwardly from the core. The core is closed at one end and is in communication at its other end with the outlet passage of the housing. As a result, liquid entering the housing through the inlet passage must pass through the filtration element of the cartridge member to pass into the core and outwardly through the outlet passage. In this embodiment the system also includes an interconnecting conduit between the outlet passage of the tank filter and the inlet passage of the cartridge unit to permit the flow of liquids therebetween, in addition to pump means to force a liquid through the system for filtration thereby.

Such a system may also include a backflush valve comprising a substantially sealed valve body and a flow directing valve member moveable therewithin between filtration and backflush positions. The valve is connected to the tank filter unit, the cartridge filter unit, and the pump means, and has a waste passage outlet therefrom. In the filtration position the valve connects the inlet passage of the tank filter unit with the outlet side of the pump means, and the outlet passage of the tank filter unit with the inlet passage of the cartridge unit; simultaneously, it blocks the waste passage outlet. As a result, flow is directed along a sequential path through the inlet passage, filtration bed, and outlet passage of the tank filter unit, thereafter through the interconnecting conduit, and then through the inlet passage, cartridge member, and outlet passage of the cartridge filter unit. In the backflush position the valve connects the inlet passage of the tank unit with the waste passage outlet of the valve, and the outlet passage of the tank unit with the outlet side of the pump; simultaneously, it blocks the inlet passage of the cartridge unit. As a result flow is directed into the outlet passage and out of the inlet passage of the tank unit without passing through the cartridge filter unit, and changes in flow direction require no reversal of direction of the pump means provided in the system.

BRIEF DESCRIPTION OF THE DRAWINGS

FIG. 1 is a perspective view of a filtration system embodying the present invention with portions of conduits, the filter tank, and the backflush valve broken away for clarity of illustration and to show internal features of the system;

FIG. 2 is a sectional view of the filter underdrain device illustrated in FIG. 1 along the line 2—2 thereof and drawn to an enlarged scale;

FIG. 3 is a fragmentary side elevational view of the upper end of the vent conduit illustrated in FIG. 1, drawn to the scale of FIG. 2 with the support means at the top of the tank in phantom line;

FIG. 4 is a sectional view of the end of the vent conduit along line 4—4 in FIG. 3 and drawn to a further enlarged scale;

DETAILED DESCRIPTION OF THE ILLUSTRATED EMBODIMENT

Figure 6:
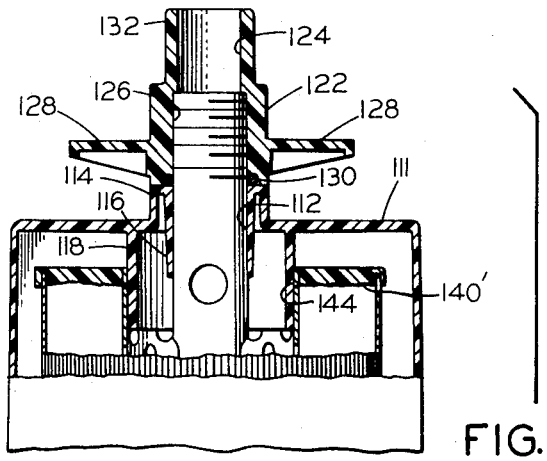
FIG. 6 is a fragmentary elevational view of the cartridge filter unit of the assembly of FIG. 5, drawn to a further enlarged scale and in partial section to illustrate the internal features thereof.

Turning now to FIGS. 1–7 of the appended drawings, therein illustrated is a filtration system embodying the present invention and consisting of a filter tank assembly, a pump unit, and a cartridge filter unit, generally designated by the numerals 10, 12 and 14, respectively. The filter tank assembly 10 includes an upright tank 16 having a closed bottom end and an upwardly extending cylindrical sidewall 17. A lid 18 is mounted over the open upper end of the tank 16 with the bead of the upper edge of the sidewall 17 received in the downwardly opening, generally U-shaped flange 19 that extends circumferentially about the lid 18. A clamping ring 20 extends about the flange 19 and securely and sealingly engages the lid 18 upon the tank 16. Centrally located on the lid 18 and in effective communication with the interior of the tank 16 is a pressure gauge 22, which has associated conventional means for sealingly mounting it thereon.

The tank 16 is filled to approximately half its depth with sand 23 or another suitable particulate filtration medium, and a vertical standpipe 24 passes downwardly into the bed of sand 23 and has a free end 25 extending above the upper surface 21 thereof. The opposite end of the standpipe 24 is provided with a right-angle elbow 27, which is directed outwardly for communication through a suitable opening (not shown) in the sidewall 17 of the tank 16.

Mounted upon the outside of the tank 16 is a backflush valve, generally designated by the numeral 26, comprising a cylindrical housing 28 which is closed at its lower end and has a cover 30 affixed across the upper end thereof. A sealing ring assembly 33 is secured within the end of the housing 28 under the cover 30, and the shaft 32 of a valve piston assembly, generally designated by the numeral 34, passes through the axial passageway 31 therein. The piston assembly 34 includes a pair of annular resilient sealing elements 36 which are secured on the shaft 32 and maintained in a spaced relationship by the spacer 38 mounted therebetween. The upper sealing element 36 is retained against one end of the spacer 38 by an appropriately affixed collar 40, and the lower sealing element 36 is retained on the end of the shaft 32 by means not visible. At the opposite end of the shaft 32 is a spherical handle 42, by which the piston assembly 34 may be slidingly shifted between upper and lower positions within the cylindrical housing 28.

The housing 28 is provided with five ports 44 (three in the front and two in the rear), each of which has extending thereabout a short cylindrical coupling or port extension which projects radially outwardly therefrom. The rear port extensions are numbered 46; in the front of the valve 26 the uppermost or waste extension is numbered 45, the central or pump extension is numbered 47, and the bottommost or return extension is numbered 49. The rear upper port extension 46 extends inwardly through the cylindrical sidewall 17 of the tank 16 and is connected to the elbow 27 on the end of the vertical standpipe 24. Lower rear extension 46 also extends inwardly through an aperture (not visible) in the sidewall 17 of the tank 16, and is connected to the open end of a filter underdrain device, generally designated by the numeral 48.

The underdrain device 48 is most desirably of the type described and claimed in copending United States Application for Letters Patent of Norbert L. Reiner and Bruce Hunter entitled "Filter Underdrain Assembly and Method of Producing Same," which was filed on Mar. 16, 1971, and bears Ser. No. 124,725, now U. S. Pat. No. 3,685,657 granted Aug. 22, 1972. The underdrain device 48 illustrated in FIG. 1 has at its inner end an internally threaded collar 50 engaged upon the lower port extension 46 of the valve 26. Extending outwardly from the opposite side of the collar 50 is a perforated cylindrical support tube 52 (as may be seen in FIG. 2) on which is engaged a filter sleeve 54, which is preferably of a tightly woven fabric and is most desirably made of a synthetic polyethylene terephthalate-type polyester. As will be appreciated, the underdrain device 48 is closed at the outer end of the support tube 52 by end wall 53 and is completely sealed except within the portion underlying the sleeve 54, so that any liquid passing therethrough must initially pass through the porous body comprised of the tube 52 and fabric 54. As a result, sand particles entrained in the liquid are removed, and particles from the surrounding bed 23 are prevented from entering the underdrain device 48 and consequently other portions of the system.

As can best be seen in FIG. 2, the collar 50 of the underdrain device 48 is provided with a radial aperture 56 in which is threadably engaged a nipple 58 having a barbed outer end (not exposed). The barbed end of the nipple 58 is inserted into one end of a small diameter vent line or hose 60 which passes upwardly through the sand bed 23 to the vicinity of the tank lid 18, whereat the free end 61 is engaged in an overhead support fixture 62 mounted beneath the pressure gauge 22. As may best be seen with reference to FIGS. 3 and 4, the free end 61 of the vent line 60 has received therein a strainer head, generally designated by the numeral 64, which consists of a funnel-shaped core member 66 having a barbed cylindrical stem 68 and a conical end portion 70. A strainer cap 72 has an end wall 73 with slots 71 extending thereacross and a sidewall 75 with an inwardly projecting circumferential bead or lip 77 extending thereabout. The strainer cap 72 is snapped over the core member 66 with the outer circumferential edge of the conical portion 70 engaged behind the lip 77 thereof. The strainer head permits the passage of air and water through the vent line 60 while preventing entry of particles of the filtration medium, as might otherwise occur during operation and backflushing of the tank assembly 10.

Figure 5:
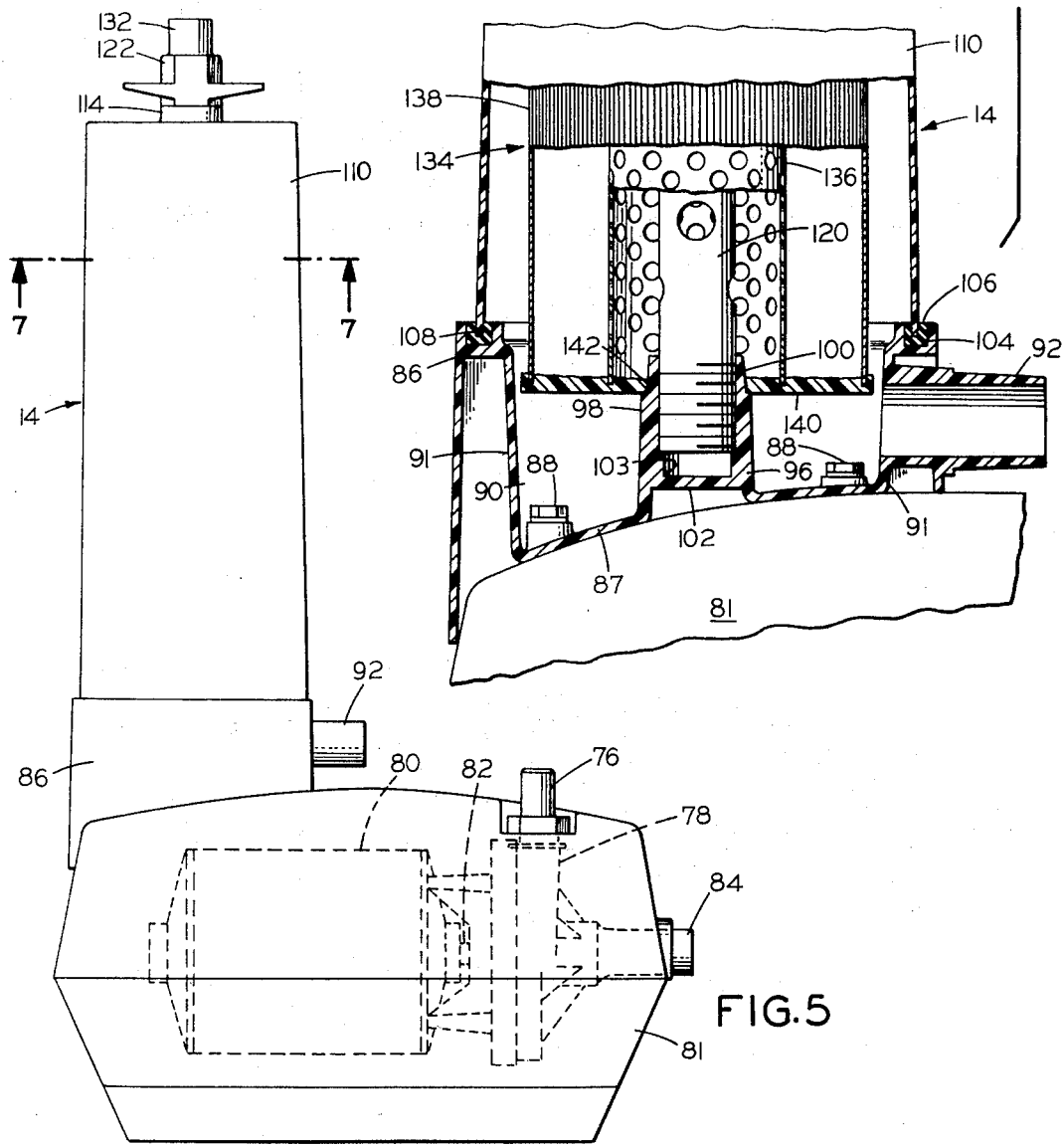
FIG. 5 is a left side elevational view of the cartridge filter unit and motor housing assembly of the system of FIG. 1, drawn to an enlarged scale with the conduit portions removed from the coupling extensions and with the pump and motor within the housing in dotted line.
Figure 7:
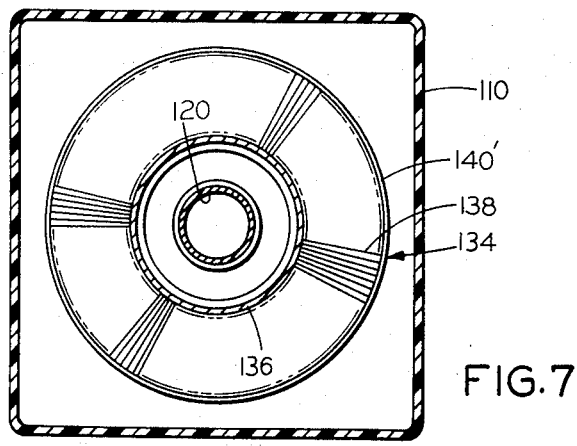
FIG. 7 is a sectional view of the cartridge filter unit along the line 7—7 of FIG. 5 and drawn to the scale of FIG. 6.

The hose 74 extends from the pump extension 47 of the backflush valve housing 28 to the hose coupling outlet extension 76 of the pump impeller assembly 78 (best seen in FIG. 5). The impeller assembly 78 is mounted upon one end of an electric motor 80, and both are contained within the pump unit housing 81. The shaft 82 of the motor 80 is coupled to the impeller assembly 78 to pump water (such as from a swimming pool) through a hose (not shown) engaged over the cylindrical hose coupling inlet extension 84 on the impeller assembly 78, and a strainer basket or other means (also not shown) may be installed in the line ahead of the pump impeller assembly 78 to effect a preliminary removal of debris and other readily filterable matter.

Turning now in detail to FIG. 6 the cartridge filter unit 14 includes a base 86 having a double sidewall construction and a bottom wall 87 that is contoured to mate with the portion of the pump unit housing 81 upon which it is mounted. The base 86 is secured by bolts 88 which are engaged in blind apertures (not illustrated) of the housing 81 to prevent leakage of water thereinto. An upwardly opening well 90 is defined by the inner wall 91 of the base 86, and an externally tapered cylindrical conduit portion 92 extends outwardly to provide a passage through the sidewall 91 into the well 90. As is illustrated in FIG. 1, an extensible hose 94 interconnects the conduit portion 92 with the return port extension 49 of the backflush valve 26 to permit the flow of water therebetween.

Centrally located on the base 86 is an upstanding hub portion 96 consisting of an internally threaded cylindrical sidewall 98 with an externally tapered upper engagement portion 100 and a bottom wall 102, which cooperatively define a socket 103 therewithin.

Extending about the upper rim of the base 86 is a generally U-shaped peripheral channel 104, in which is in turn seated a U-shaped gasket 106. Sealingly engaged within the gasket 106 is the lower edge 108 of the cover 110 of the cartridge unit 14; the cover 110 is of rectangular cross section and has through its top wall 111 a centrally located axial passageway 112. The passageway 112 is defined by an upwardly extending collar portion 114 and an internal sleeve portion 116 depending from the upper edge thereof. A circular wall 118 defining an outer sleeve portion depends from the top wall 111 in coaxial relationship with the sleeve portion 116 and outwardly thereof.

A perforated central pipe 120 is mounted in the base 86 with one end threadably engaged within the socket 103 of the hub 96 thereof. The pipe 120 extends upwardly through the internal sleeve portion 116 of the cover 110, the inside diameter of the sleeve portion 116 being approximately equal to the outside diameter of the pipe 120 to provide a snug sliding fit therebetween. A coupling nut 122 having an axial bore 124 therethrough with a threaded lower portion 126 of enlarged diameter is engaged upon the upper end of the pipe 120. The outwardly projecting wing elements 128 of the coupling nut 122 facilitate hand tightening against the upper edge of the collar portion 114, with the O-ring 130, which is positioned adjacent the outer end of the threaded portion 126 of the nut 122, forming a tight seal against the upper edge of the collar portion 114 to prevent leakage of water thereat. The outer end 132 of the coupling member 124 is of reduced external diameter and provides a mounting portion over which a suitable hose (not shown) may be engaged for the return of filtered water to a swimming pool or the like.

Within the cartridge filter unit 14 is contained a filter cartridge, generally designated by the numeral 134, which consists of a perforated cylindrical core 136, a radially pleated, star-shaped filter element 138 extending thereabout and along substantially the entire length thereof, and a pair of annular retaining end caps 140 molded about the ends of the element 138. The aperture 142 in the lower end cap 140 is somewhat smaller than the aperture 144 provided in the upper end cap 140', and is dimensioned to sealingly seat upon the tapered engagement portion 100 of the hub 96 extending from the base 86. The circular wall 188 depending from the top wall 111 of the cover 110 is dimensioned to fit snugly in telescoping fashion within the aperture 144 of the upper end cap 140'. As a result, water flowing through the conduit portion 92 and into the well 90 of the base 86 passes in a generally normal direction through the filter element 138 enroute to the interior of the perforated core 136, and thereafter outwardly through the hose mounting portion 132 of the coupling nut 122.

Figure 8:
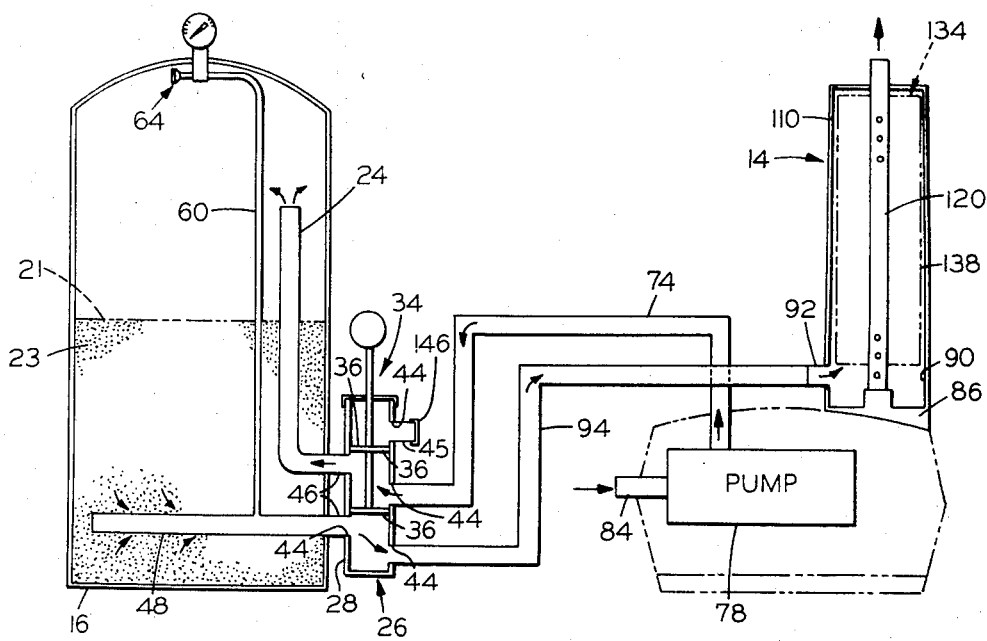
FIG. 8 is a diagrammatical representation of the system of FIG. 1 with the backflush valve in its filtering position to pass water from the pump into the filter tank unit and outwardly through the cartridge filter unit.

From the foregoing description, and with particular reference now to FIG. 8, operation of the system during filtration will be readily understood. With the piston 34 of the backflush valve 26 in the raised position shown the pump 78 draws water inwardly through the inlet extension 84 and forces it through the hose 74 into the valve 26. The water then flows upwardly through the vertical standpipe 24 and discharges upon the upper surface 21 of the sand bed 23. Because the tank 16 is substantially sealed, pressure and the force of gravity cause the water to filter downwardly through the sand bed 23, thus cleansing the water and removing entrained matter, especially particles of relatively large diameter (e.g. 50 to 60 microns). The water then proceeds into the underdrain device 48, through the lower portion of the valve 26 defined beneath the bottom sealing element 36, through the hose 94 and into the well 90 of the cartridge unit base 86. From the well 90 the water flows upwardly about and inwardly through the element 138 of the filter cartridge 134, and then it passes into the perforated central pipe 120 and out the top, generally to be returned to the source. Air introduced into the tank 16 will automatically be removed from the system by passage through the vent conduit 61, and the axial flow of water through the underdrain device 48 past the radial or perpendicular aperture 56 will tend to reduce pressure within the conduit 61 and thereby enhance the venting effect.

The filter tank assembly 10 is cleaned by backwashing, which is accomplished by shifting the piston assembly 34 of the valve 26 downwardly in the housing 28. This repositions the upper sealing element 36 between the upper rear and the central forward ports 44, while moving the lower sealing element 36 to a position between the lower rear and lower forward ports 44. As a result, water may be pumped through the hose 74 and into the valve 26 without passing through the cartridge filter unit 14; it then passes outwardly through the underdrain device 48 to remove particles of sand and other matter that may have become lodged in the filter sleeve 54. The water will then pass upwardly through the sand bed 23 and through the standpipe 34 and back into the valve 26. From the valve 26 it may be conveyed to a suitable conduit attached to the waste port extension 45 to ultimately be discharged to an appropriate waste water facility. As will be appreciated, the cap 146 which is normally positioned upon the waste port extension 45 will be removed during the backflush operation.

The tank unit, which typically filters particles in excess of 50 to 60 microns, cooperates in a highly effective manner with the cartridge unit, which generally has an element capable of removing particles in excess of 2 to 12 microns, and preferably it will remove particles larger than about 5 to 10 microns. Because of the initial effect of the tank filter the capacity of the cartridge unit does not have to be unduly high and it need not be replaced with excessive frequency. Nevertheless, the system produces water that is clear and pure at practical flow rates and without the need for unduly high pressures to pump the water through the system.

Thus, it can be seen that the present invention provides a novel filtration system for liquids having means to automatically prevent the accumulation of gases within a substantially sealed tank thereof. More particularly, the invention provides for a system in which vent means is conveniently and inexpensively provided. The system is capable of removing very small particles from the liquid at high flow rates and under relatively low pump pressures, and the filtration units used may be of entirely practical dimensions. After periods of operation the system can be prepared for reuse with relative facility, and such preparation is required on a relatively infrequent basis. In a specific embodiment the tank filter unit of the system can be readily cleaned by backflushing without need for the flush water to pass through the cartridge filter unit thereof, with characteristics of the latter and of the system as a whole virtually eliminating any problem of gas accumulation in the cartridge unit.

The element of the cartridge unit has been defined to be capable of removing particles in excess of 2 to 12, and preferably 5 to 10 microns, and to have pores within the same ranges; these definitions are intended to be synonymous, as used herein. Since pore sizes vary to a considerable extent, the ranges set forth therefor should be understood to indicate average values. In addition, although the drawings illustrate the tank filled to half its depth with the particulate filtering medium, generally an amount sufficient to fill two thirds to three quarters of the tank depth will be used in practice.

Having thus described the invention I claim:

1. In a filtration system for liquids, the combination comprising:

a. a tank filter unit comprising a substantially sealed tank providing a chamber partially filled with a particulate medium to provide a filtration bed in a lower portion thereof, said tank having inlet and outlet passages from said chamber to the exterior thereof with said inlet passage opening into said chamber at a location above the normal upper surface of said filtration bed;

b. a filter underdrain device having a porous filtration portion normally buried in said filtration bed and being adapted to permit liquid flow therethrough while preventing the entry of particles of said bed thereinto, and an elongated, substantially nonporous connecting portion providing a conduit extending from said filtration portion and connected to said outlet passage to provide communication therewith from the interior of said filtration portion;

c. a vent conduit extending from a point adjacent the upper surface of said chamber and downwardly through said filtration bed into connection with said underdrain device, said vent conduit being open at its upper end to the upper portion of said chamber and opening at its other end into said connecting portion of said underdrain device substantially perpendicularly to the longitudinal axis of said conduit and providing an outlet for gas from said tank into fluid being discharged through said outlet passage, whereby at the point of passage past said other end of said vent conduit, water flowing therethrough has a substantial flow vector velocity along the axis of said connecting portion tending to reduce pressure within said vent conduit to facilitate escape of gas from the vicinity of said tank top, thereby eliminating pressure buildup in the upper portion of said chamber;

d. a cartridge filter unit comprising a substantially sealed housing having an internal chamber with an inlet passage thereinto and an outlet passage therefrom, and a replaceable cartridge member within said housing, said cartridge member including an elongated perforated core and an axially pleated filtration element of porous fabric having pores about 2 to 22 microns in diameter, said filtration element extending about and axially along said core over the perforations thereof with the pleats of said fabric extending radially outwardly from said core, said core being closed at one end and in communication at its other end with said outlet passage of said housing so that liquid entering through said inlet passage into said housing must past through said filtration element of said cartridge member to pass into said core and outwardly through said outlet passage;

e. an interconnecting conduit between the other end of said outlet passage of said tank filter unit and said inlet passage of said cartridge unit to permit the flow of liquids therebetween;

f. pump means for forcing a liquid through said system for filtration thereby.

2. The system of claim 1 wherein said filtration portion of said underdrain device comprises a tubular strainer body having a perforated sidewall, and a fabric covering of filaments plaited directly upon the exterior surface of said strainer body and extending entirely thereabout over substantially the entire length thereof.

3. The system of claim 2 wherein said fabric covering is fabricated of a synthetic resinous material.

4. The assembly of claim 3 wherein said synthetic resinous material of said fabric is a polyester.

5. The system of claim 1 wherein the top wall of said tank is generally dome-shaped, and wherein there is provided thereon a point of support adjacent the apex thereof for said vent conduit.

6. The system of claim 5 wherein said vent conduit includes a strainer head engaged in said one end thereof, said strainer head having a plurality of openings therethrough providing a flow passage into said vent conduit, said openings being dimensioned to admit liquids while being sufficiently small to prevent passage of particles of said particulate medium therethrough.

7. The system of claim 1 additionally including a backflush valve comprising a substantially sealed valve body and a flow directing valve member moveable therewithin between filtration and backflush positions, said valve being connected to said tank filter unit, said cartridge filter unit, and said pump means, and having a waste passage outlet therefrom, in said filtration position said valve interconnecting said inlet passage of said tank filter unit with the outlet side of said pump means and said outlet passage of said tank filter unit with said inlet passage of said cartridge unit while blocking said waste passage outlet, and in said backflush position said valve interconnecting said inlet passage of said tank unit with said waste passage outlet and said outlet passage of said tank unit with said outlet side of said pump means while blocking said inlet passage of said cartridge unit, so that in said filtration position said valve directs flow along a sequential path through said inlet passage, filtration bed, and outlet passage of said tank filter unit, said interconnecting conduit, and said inlet passage, cartridge member, and outlet passage of said cartridge filter unit, and in said backflush position said valve directs flow into said outlet passage and out of said inlet passage of said tank unit without passing through said cartridge filter unit and without reversal of direction of said pump means.

8. The system of claim 1 additionally including a vent conduit within said tank filter unit extending from a point adjacent the upper surface of said chamber and downwardly through said filtration bed into connection with said underdrain device, said vent conduit being open at its upper end to the upper portion of said chamber of said tank and opening at its other end into said underdrain device and providing an outlet for gas from said tank into fluid being discharged through said outlet passage, thereby eliminating pressure buildup in the upper portion of said chamber.

9. The system of claim 7 wherein said valve body has a generally cylindrical sidewall having a multiplicity of ports equidistantly spaced axially along the length thereof, and wherein said flow directing valve member comprises a piston assembly seated, in said valve body for axial sliding movement therein between said filtration and backflush position, said piston assembly including a pair of axially spaced, disk-shaped sealing elements in sealing engagement with said sidewall, the spacing between said sealing elements causing them to encompass only two adjacent ports, establishing communication therebetween and isolating said two ports from the other ports of said valve body.

10. The system of claim 1 wherein said pleated filtration element is of a porous fabric having pores about 5 to 10 microns in diameter.

* * * * *